Figure 1:
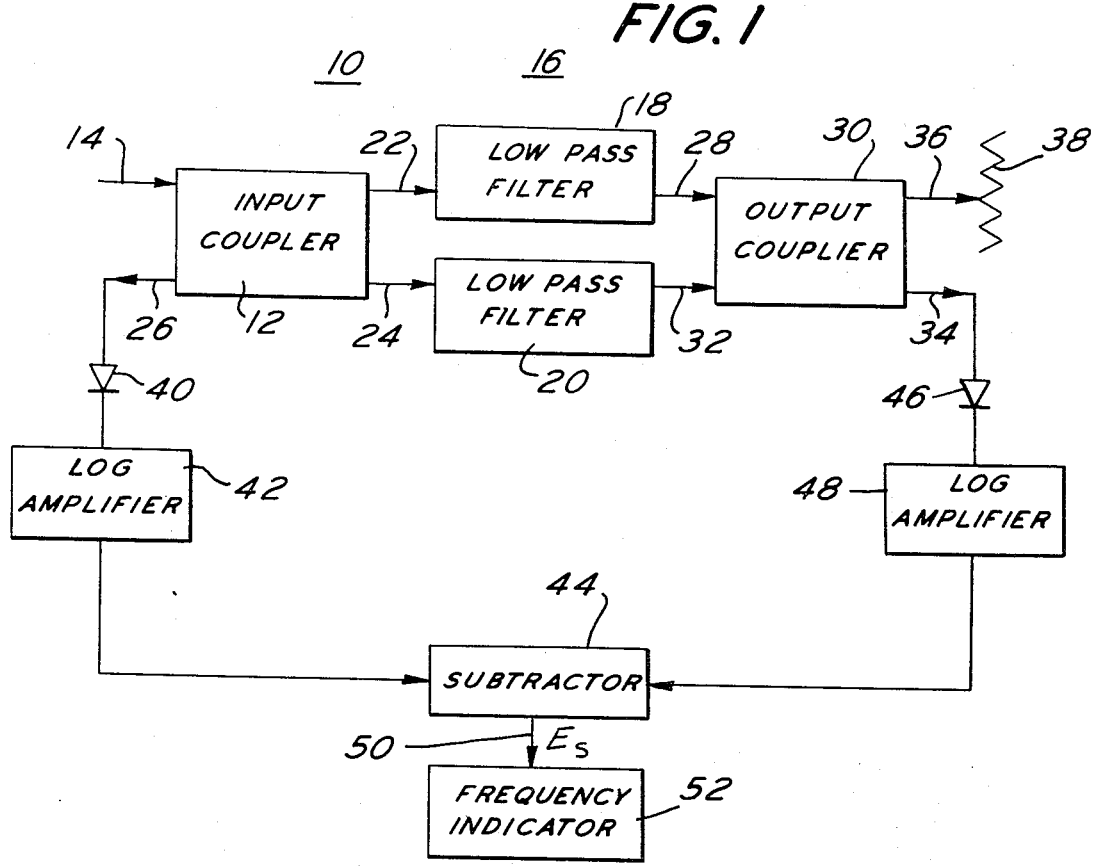

United States Patent [19]
Konrad

[11] 3,775,681
[45] Nov. 27, 1973

[54] FREQUENCY MEASURING MEANS

[76] Inventor: Leonard J. Konrad, East Vineland, N.J.

[22] Filed: July 14, 1972

[21] Appl. No.: 271,904

[52] U.S. Cl. .............................. 324/78 R, 324/58 R
[51] Int. Cl. ....................... G01r 23/02, G01r 27/04
[58] Field of Search ............... 324/78 R, 78 E, 78 J, 324/82, 58 R, 58 A, 58 B

[56] References Cited
UNITED STATES PATENTS
3,257,614   6/1966   Honkan et al. .................... 324/78 R
FOREIGN PATENTS OR APPLICATIONS
920,585   3/1963   Great Britain .................... 324/78 R Primary Examiner—Alfred E. Smith
Attorney—Jacob Trachtman

[57] ABSTRACT

A frequency measuring means comprising a network having input means for receiving a signal which is to have its frequency measured and output means delivering signals transmitted therethrough, said network providing a signal transfer characteristic which is a function of frequency for the range of frequencies to be measured, first means deriving signals reflected from the input means of said network, second means deriving from the output means signals transmitted by said network, and third means receiving and comparing signals from said first and second means for providing an indication of the frequency of a signal delivered to the input of the network.

10 Claims, 2 Drawing Figures

FREQUENCY MEASURING MEANS

The invention relates to a frequency measuring means and more particularly to a frequency measuring means which provides an instantaneous measurement of frequency of pulse signals.

Heretofore, frequency measuring means have been provided which have used a large number of components or complex circuitry for providing a frequency measurement. Such devices have been difficult to manufacture, align and maintain in operation, and have not provided instantaneous frequency measurements of short duration pulse signals over an extended frequency range.

It is therefore, the primary object of the invention to provide a new and improved frequency measuring means for instantaneously providing an indication of signal frequency for a pulse of short duration.

Another object of the invention is to provide a new and improved frequency measuring means giving frequency indications on a pulse basis up to an octave band range of frequencies.

Another object of the invention is to provide a new and improved frequency measuring means which within its dynamic range of RF power input levels provides a frequency indication which is independent of the power of the radio frequency signal.

Another object of the invention is to provide a new and improved frequency measuring means which operates in real time to provide a frequency indication equal to the duration of the incoming radio frequency pulse.

Another object of the invention is to provide a new and improved frequency measuring means requiring a minimum number of components, which may readily be manufactured, is inexpensive in costs and provides accurate indications of frequency within extended frequency range.

The above objects as well as many others are achieved by providing a frequency measuring means which includes a first coupling unit having an input for receiving an RF signal which is to have its frequency measured, an output delivering input signals to the inputs of a pair of identical low-pass filters, and another output delivering input signals reflected from the inputs of the filters. The filters each provide a signal transfer characteristic which is a continuous function of frequency for the band of frequencies to be measured.

The signal reflected from the input to each of the filters, is delivered to a signal amplitude detector and then to a logarithmic amplifier. Similarly, the input signal passed by the filters are each delivered to an output coupler which delivers the transmitted signal to a second amplitude detector which delivers the detected signal to a second logarithmic amplifier. The output signals from the pair of logarithmic amplifiers are delivered to a comparator circuit which subtracts one input signal from the other and delivers an output difference signal. The output signal is received by a frequency indicator which provides the frequency of the input signal.

Figure 2:
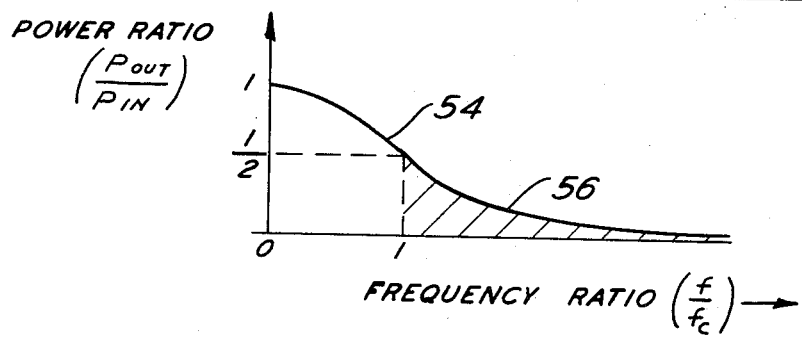

The foregoing description and objects of the invention will become more apparent as the following detailed description of the invention is read in conjunction with the drawings, in which:

FIG. 1 is a block diagram of a frequency measuring means embodying the invention, and FIG. 2 graphically illustrates the signal transmission characteristic of a filter utilized in connection with the invention.

Like reference numerals designate like parts throughout the several views.

Refer to FIG. 1 which is a block diagram illustrating a frequency measuring means 10 embodying the invention.

The frequency measuring means 10 has an input coupler 12 providing an input 14 for receiving signals which are to have their respective frequencies determined. The signals may be in the radio frequency range and occur in short pulses or as a continuous signal. The input coupler 12 delivers signals received on input 14 to a network 16 which may comprise a pair of identical low-pass filters 18 and 20. The filters 18 and 20 have a transmission characteristic which is a continuous function of frequency over the band or range of frequencies for which frequency measurement is to be made.

The input coupler 12 may be of the 3 db, 90° quadrature hybrid type which delivers one-half of the signal power received to the input of the low-pass filter 18 from its output 22, and the other one-half of the signal power to the input of the second filter 20 from its output 24. A coupler of this type is commercially known as "Anaren Series N." A characteristic of the coupler 12 is the delivery over a third output 26, of the signal delivered to the input of each of the filters 18 and 20 which is reflected back to the input coupler 12, Also characterictic of the input coupler 12 is that the reflected signals from the input from the filter 18 and 20 are not delivered to the input 14 of the coupler 12 to an appreciable extent because of a phase reversal and cancellation of such signals at the input 14.

The signal component which is received and transmitted by the filter 18 is delivered to the input 28 to an output coupler 30 which may be identical of the input coupler 12. Similarly the portion of the signal transmitted by the filter 20 is delivered to the input 32 of the coupler 30. Also characteristic of the coupler 30, is the delivery at its output 34, of the input signals to its inputs 28 and 32, while no appreciable signal is delivered to its output 36. Again signals at the inputs 28 and 32 of the coupler 30 are delivered in out of phase relationship to the output 36 causing their substantial cancellation with a resulting minimum power dissipation in the resistor 38 which is connected to the output 36 providing the characteristic termination impedance for the output 36.

The signal from the output 26 of the input coupler 12 is delivered to a diode detector 40 which may be of the square-law type for allowing operation at low signal levels and over an extended dynamic range. Such diodes, for example, are the Schottky-Barrier diode detectors, and are of the type commercially known as "Aertech Series DM."

The detected signal from the diode 40 is delivered to the input of a log amplifier 42 which delivers at its output the logarithm of the input signal. The output of the amplifier 42 is delivered to a signal comparator or subtractor 44, of the type commercially known and available as "Fairchild (MU)A-760."

The signal delivered to the output 34 of the output coupler 30 is also delivered to a detector 46 which is identical to the detector 40 and the detected signal is thereafter received and amplified by the log amplifier 48. A signal which is the logarithm of the input signal to the amplifier 48 is delivered to the subtractor 44 which provides an output signal Es over line 50 to a frequency indicating device 52. The frequency indicating device 52 may comprise different embodiments, including an anti-logger and analog to digital visual readout or printing device for providing the frequencies of the input signals.

For the purpose of describing the operation of the frequency measuring means 10, consider the signal transfer characteristic of the network 16. For the purpose of illustration, FIG. 2, provides the transfer characteristic of a low-pass filter providing a continuous cutoff characteristic 54 which is a function of frequency along the portion 56 over the band or range of frequencies for which frequency measurement is to be made. The ordinate or the graph in FIG. 2 provides the power ratio of the output signal delivered by each of the filters 18 and 20 to the coupler 30, to the input signal received from the coupler 12. The absicissa of the graph denotes the ratio of the frequency ($f$) of the input signal to be measured to the cut-off frequency ($f_c$) of the filter. The cut-off frequency $f_c$ is taken by definition as the frequency for which the transmitted power indicated by the filter characteristic 54 is one-half. The operating range for the frequency measuring means 10 may be taken to extend from the point where the ratio ($f/f_c$) is equal to 1 to a value greater than 1, up to a point where the signal is still of sufficient power level to provide accurate frequency indications. Such an extend is well over an octave for RF signals providing a frequency measuring means with a range of at least one octave for frequency determinations.

Considering the transfer characteristic, for the purpose of this example, of a low-pass filter, providing a continuous cut-off characteristic which is a function of frequency, such as that of an $n$-th order Butterworth type, the power transfer function is given by $$t^2 = P_{out}/P_{in} = 1/1 + (w/w_c)^{2n}$$

(1)

which with "$2\pi f$" substituteed for "w" becomes $$t^2 = P_{out}/P_{in} = 1/1 + (f/f_c)^{2n}$$

(1a)

when $n$ is the order of the filter, $n = 1, 2, \ldots$ and $f_c$ is the so-called 3 db or half power cut-off frequency. Thus when $f = f_c$ then $$P_{out}/P_{in} = 1/1 + (1)^{2n} = \tfrac{1}{2}$$

(2)

and the logarithm of both sides of the equation provides $$10 \log P_{out}/P_{in} = 10 \log \tfrac{1}{2} = -3 db$$

(3)

From the above it is noted that the frequency $f_c$ is that for which the input signal provides an output power which is one-half of the input power. The characteristic curve of FIG. 2 illustrates this characteristic as the function of frequency for the transfer out input-output characteristic of the filter.

The operation of the instantaneous frequency measuring means 10 is in the region where $f/f_c$ is equal to or greater than 1. When the frequency of the incoming signal is equal to the cut-off frequency $f_c$ the output signal provided by the subtractor 44 is zero. The extent to which the frequency measuring means 10 can measure frequency beyond the cut-off frequency as the output transfer siganl diminishes, is a function of noise level and other factors which provide a minimum useable signal for processing. Determination has been made that optimum operation of the system is effected for frequencies equal to a greater than $1.4f_c$. Thus, if an octave band of operation is desired, then the frequency range would be, $$1.4f_c \leq f \leq 2.8f_c$$

Although equation (1) is that for an $n$-th order Butterworth low-pass filter, it may be possible to use filters with other transfer functions, although it was found that the Butterworth filter was relatively easy to construct.

With the power transfer function provided in equation (1a) above, it is noted that the power of the reflected signal delivered to the output 26 of the coupler 12 may be expressed by $$r^2 = 1 - t^2 = (f/f_c)^{2n}/ 1 + (f/f_c)^{2n}$$

(5)

The log of the transfer function of equation (1a) is given by $$\log t^2 = \log (1/1 + (f/f_c)^{2n})$$

(6)

while the log of reflected power signals is given by $$\log r^2 = \log ( (f/f_c)^{2n}/1 + (f/f_c)^{2n})$$

(7)

The subtraction of the above logarithmic signals provided by the amplifiers 42 and 48 provides the output signals Es of the comparator or subtractor 44 and is expressed by $$Es = \log t^2 - \log r^2$$

(8a)

$$= -2 n \log (f/f_c) = K \log (f) + C$$

(8b)

The output signal Es of the subtractor 44, thus, is a function of frequency only and contains no terms related to the power of the received or processed signals. The anti-log of the signal Es from the subtractor 44 provides a signal which is directly related to the frequency of the incoming signal. An analog to digital converter or other such means can be used to display or record in real time the frequencies of incoming signals.

It will be obvious to those skilled in the art that the invention may find wide application with appropriate modification to meet the individual design circumstances, but without substantial departure of the essence of the invention.

What is claimed is:

1. A frequency measuring means comprising a network having input means for receiving an input signal which is to have its frequency measured and output means delivering signals transmitted therethrough, said network providing a signal transfer characteristic which is a function of frequency for the range of frequencies to be measured, first means deriving from the input means of said network only input signals reflected by said network, second means deriving from the output means of said network only input signals transmitted by said network, and third means receiving and comparing signals from said first and second means for providing an indication of the frequency of a signal delivered to the input of said network.

2. The frequency measuring means of claim 1 in which said network comprises an electrical filter with a continuous cut-off characteristic which is a function of frequency for the range of frequencies to be measured.

3. The frequency measuring means of claim 2 in which said filter network is a low pass filter.

4. The frequency measuring means of claim 2 in which said filter network is of the Butterworth type.

5. The frequency measuring means of claim 1 in which said third means includes first and second signal amplitude detectors respectively receiving reflected signals from the first means and transmitted signals from said second means and delivering respective output signals, first and second amplifiers receiving detected signals respectively from said first and second detectors and delivering respective output signals which are logarithmic functions of the received signals, and a comparator receiving the output signals from said first and second amplifiers and delivering output signals which correspond to the difference between the received signals for providing an indication of the frequency of the signal delivered to the input of said network.

6. A frequency measuring means comprising a network having input means for receiving a signal which is to have its frequency measured and output means delivering signals transmitted therethrough, said network providing a signal transfer characteristic which is a function of frequency for the range of frequencies to be measured, first means deriving signals reflected from the input means of said network, second means deriving from the output means signals transmitte by said network, and thrid means receiving and comparing signals from said first and second means for providing an indication of the frequency of a signal delivered to the input of said network, said first means including a first coupling unit having an input for receiving a signal which is to have its frequency measured, an output delivering input signals to the input means of said network and an another output delivering signals reflected from the input means of said network, said second means including a second coupling unit having an input for receiving output signals from the output means of said network and an output delivering signals received from said network.

7. The frequency measuring means of claim 6 in which said network includes first and second electrical filters each having an input and an output and a continuous cut-off characteristic which is a function of frequency for the range of frequencies to be measured, said first coupling unit has first and second output terminals delivering an input signal to the respective inputs of the first and second filters and a third output terminal delivering signals reflected from the inputs of said first and second filters, and said second coupling unit has first and second input terminals receiving input signals respectively from the outputs of said first and second filters and a third output terminal delivering signals received from the outputs of said filters.

8. A frequency measuring means comprising a network having input means for receiving a signal which is to have its frequency measured and output means delivering signals transmitted threrthrough, said network providing a signal transfer characteristic which is a function of frequency for the range of frequencies to be measured, first means deriving signals reflected from the input means of said network, second means deriving from the output means signals transmitted by said network, and third means receiving and comparing signals from said first and second means for providing an indication of the frequency of a signal delivered to the input of said network, said third means including first and second signal amplitude detectors respectively receiving reflected signals from the first means and transmitted signals from said second means and delivering respective output signals, first and second amplifiers receiving detected signals respectively from said first and second detectors and delivering respective output signals which are logarithmic functions of the received signals, and a comparator receiving the output signals from said first and second amplifiers and delivering output signals which correspond to the difference between the received signals for providing an indication of the frequency of the signal delivered to the input of said network, said network including first and second electrical filters each having an input and an output and a continuous cut-off characteristic which is a function of frequency for the range of frequencies to be measured, said first means including a first coupling unit having an input terminal for receiving a signal which is to have its frequency measured, first and second output terminals each delivering an input signal to the respective inputs of the first and second filters and a third output terminal delivering to the first detector of said third means signals reflected from the inputs of said first and second filters, and said second means including a second coupling unit having first and second input terminals receiving input signals respectively from the outputs of said first and second filters and a third output terminal delivering to the second detector of said third means signals received from the outputs of said filters.

9. The frequency measuring means of claim 12 in which said first and second filters are identical and of the Butterworth type, said first and second coupling units are each of the 3 db quadrature hybrid type, said first and second detectors are square-law diode detectors, and said comparator is a signal subtractor device.

10. The frequency measuring means of claim 12 including a frequency indicating means receiving the output signal from said comparator including converting means providing an output signal which relates to the antilog of the received signal and means response to the signal from said convertor for providing the frequency of the input signal to said network.

* * * * *